(12) United States Patent
Leeper

(10) Patent No.: US 10,980,223 B2
(45) Date of Patent: Apr. 20, 2021

(54) READILY CLEANED AERATED BAIT BUCKET

(71) Applicant: Robert Leeper, White Bear Township, MN (US)

(72) Inventor: Robert Leeper, White Bear Township, MN (US)

(\*) Notice: Subject to any disclaimer, the term of this patent is extended or adjusted under 35 U.S.C. 154(b) by 336 days.

(21) Appl. No.: 16/100,336

(22) Filed: Aug. 10, 2018

(65) Prior Publication Data

US 2020/0045948 A1 Feb. 13, 2020

(51) Int. Cl.
*A01K 97/05* (2006.01)

(52) U.S. Cl.
CPC .................... *A01K 97/05* (2013.01)

(58) Field of Classification Search
CPC ......... A01K 97/05; A01K 97/04; A01K 97/22
See application file for complete search history.

(56) References Cited

U.S. PATENT DOCUMENTS

| | | | | |
|---|---|---|---|---|
| 2,968,887 | A * | 1/1961 | Woolworth | A01K 97/05 43/56 |
| 3,005,571 | A * | 10/1961 | Hugh Hall | A01K 97/05 220/324 |
| 4,261,131 | A * | 4/1981 | Poffenberger | A01K 97/05 43/57 |
| 4,757,636 | A | 7/1988 | Lambourn | |
| 5,659,995 | A * | 8/1997 | Hoffman | A01K 97/06 220/504 |
| 6,820,364 | B1 * | 11/2004 | Tyson | A01K 97/04 220/735 |
| 7,017,297 | B1 * | 3/2006 | Ward | A01K 97/20 43/55 |
| 7,644,535 | B2 * | 1/2010 | Sloop | A01K 97/05 43/56 |
| 8,806,803 | B1 * | 8/2014 | Mitchell | A01K 97/06 43/54.1 |
| 2008/0250697 | A1 * | 10/2008 | Wasnick | A01K 97/05 43/56 |

\* cited by examiner

*Primary Examiner* — Richard G Davis
(74) *Attorney, Agent, or Firm* — Mark A. Litman & Associates, P.A.

(57) ABSTRACT

A bait bucket temporarily stores fishing bait and water within a water stable bucket component having a water-tight base and side walls and a top opening. A locking cap is removeably secured around the top opening in the bucket component and further includes a connector receiving a pivoting closing cap and a locking snap-in element that temporarily secures the pivoting closing cap to the locking cap. A handle pivotably attaches to the bucket component enabling lifting of the bait bucket.

12 Claims, 4 Drawing Sheets

READILY CLEANED AERATED BAIT BUCKET

BACKGROUND OF THE INVENTION

1. Field of the Invention

The present invention relates to the field of fishing bait containers, and particularly reusable fishing bait containers that are hand-carried.

2. Background of the Art

When individual go fishing for sport, it is usually important to carry live bait for use at the fishing site. It is important to maintain the bait in a high quality condition to assure best attractiveness to the fish.

Two examples of prior art bait containers are U.S. Pat. No. 4,757,636 (Lambourn) which shows an insulated and aerated live bait bucket and U.S. Pat. No. 7,017,297 (Ward) showing an alternative bucket design for live bait.

SUMMARY OF THE INVENTION

A bait bucket temporarily stores fishing bait and water within a water stable bucket component having a water-tight base and side walls and a top opening. A locking cap is removeably secured around the top opening in the bucket component and further includes a connector receiving a pivoting closing cap and a locking snap-in element that temporarily secures the pivoting closing cap to the locking cap. A handle pivotably attaches to the bucket component enabling lifting of the bait bucket.

DETAILED DESCRIPTION OF THE INVENTION

Figure 1:
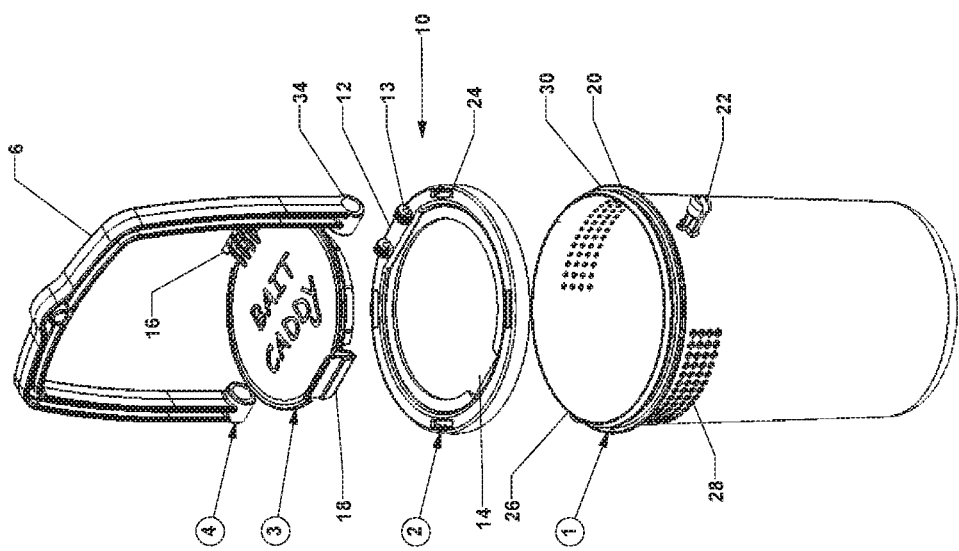
FIG. 1 shows an exploded perspective view of a bait bucket according to one aspect of the present invention.

The bait bucket of the present invention should be stable against extended contact with water, both fresh water and if used in salt water fishing, salt water. Materials such as polymers (e.g., polyacrylates, polymethacrylates, polyesters, polyethylene, polypropylene, acrylonitrile-butadiene-styrene, styrene, polyacrylonitrile, polyamides, polyvinylchloride and the like), reinforced polymers, composites, rust-resistant metal and the like may be used, with moldable (e.g., injection-molded or caste) polymers being preferred. Individual minor elements (clips, swivels, pivots, clips, the base, pins and the like) also may be metal or even ceramic. Bait Caddy Explanation of Components One alternative aspect of the present invention is that the main housing is made of Lexan® polycarbonate and is clear to transparent in appearance. This allows the user to actually see the bait they are trying to retrieve using either their own hand or a dip net. The container may float by way of inclusion of a foam piece that is permanently attached to the underside of the lid, the closing cap.

The plastic being used for the lid, ring and handle may contain an ultraviolet resistant dye(s) which will inhibit these items from warping, fading or cracking in temperatures ranging from high heat (e.g., 110 F) to sub-freezing temperatures (below 32 F).

The handle may contain a hole where a "tether" or rope-like material should be attached so the container "trolls" properly alongside a boat or canoe and also allows the user to easily retrieve the container.

The container may also be used in locations, such as a dock or shoreline, or ice-fishing hole where it will float in the water.

There may be a series of small (0.1-10 mm) holes located on opposite sides of the upper main housing. these holes allow water to flow easily in and out keeping the bait alive with fresh oxygen as well as acclimating the bait to the water, the holes preventing smaller sized bait like leeches, minnows and other bait from escaping.

The described snap closure design of the relatively large closing lid allows the user to perform a "one handed" bait retrieval. the portion of the lid that "snaps/locks" having been designed to prevent accidental opening, nor allowing the bait to escape.

Earth worms, night crawlers, grubs or any other "dry" bait may be used in the container also. The overall size of the container is such that the user can easily use it inside an on-board live well, baitwell or an 8-inch ice fishing hole making the container usable year round. Some or all of the components of the container are designed to be not be removable, such as the pin connection to the handle, or the base of the bucket component.

The disassembled bait bucket has about four major parts, a container segment (including a base and sidewalls defining an enclosing volume for water and bait), an intermediate locking ring, a snap-on or snap-in closing cap, and a pivoting handle.

Reference to the Figures will assist in a better understanding of the present invention.

FIG. 1 shows an exploded perspective view of a bait bucket 10 according to one aspect of the present invention. The bait bucket 10 components include a container segment 1 having aeration holes (optional but preferred), permanent or removable posts 22 a ledge 20 and screw threads (or snap on shape) 30. The container segment has side walls and a base (preferably cylindrical and circular, respectively, but as long as the screw threads 30 are circular, the side walls and base may be any shape) that defines a volume within which water and bait may be stored.

A locking ring 2 securely engages the container segment 1 through its base element 24 which may have snap elements or internal thread segments (not shown) on the inside of the ledge 24. There is a top engaging area 12 with female or male receptors for engagement with their counterparts in the snap-on top (shown in element 3). Also shown is a recessed engagement area 14 for engagement with a snap-in extension 18 in the closing cap 3. The top engaging area 12 is bordered by pin engaging elements 13.

The closing cap 3 is shown with a pivoting hinge element 16 which would engage the top engaging area 12 in the locking ring 2.

A handle 4 is shown with a grip area 6 and swivel enabling openings 34 that are secured to the container segment 1 by the posts 22.

Figure 2:
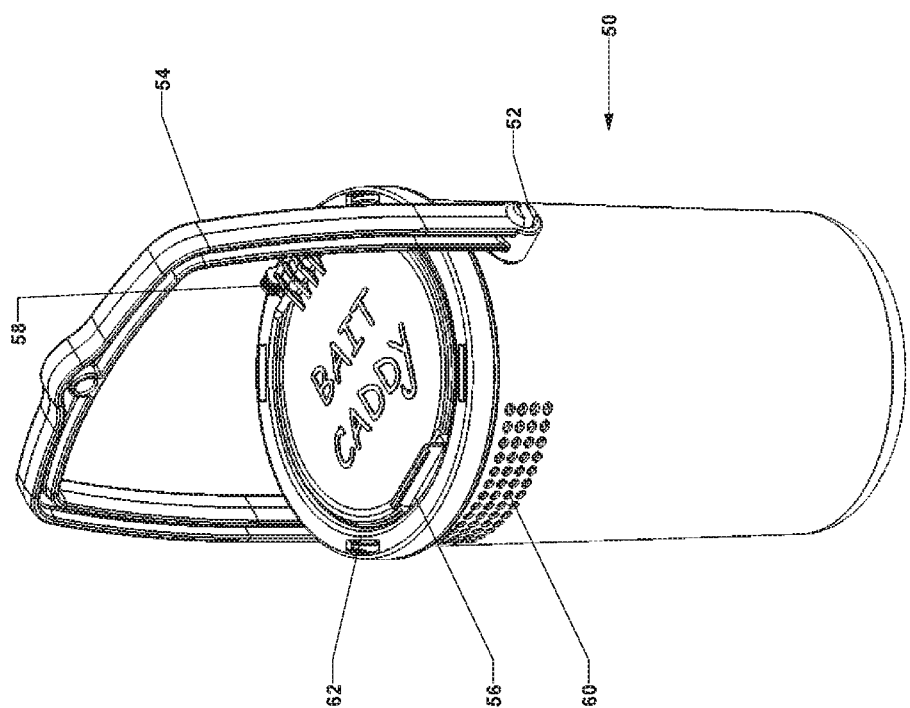
FIG. 2 shows a fully assembled bait bucket according to one aspect of the present invention using the exploded elements of FIG. 1.

FIG. 2 shows a fully assembled bait bucket 50 according to one aspect of the present invention using the exploded elements of FIG. 1. The bait bucket 50 is shown with optional aeration holes 60, a closed (locked) snap-in extension 56, the pivoting engagement elements 58, the closing cap 62 and the handle 58 with engaged pivoting connection 52 of the handle 54.

Figure 3:
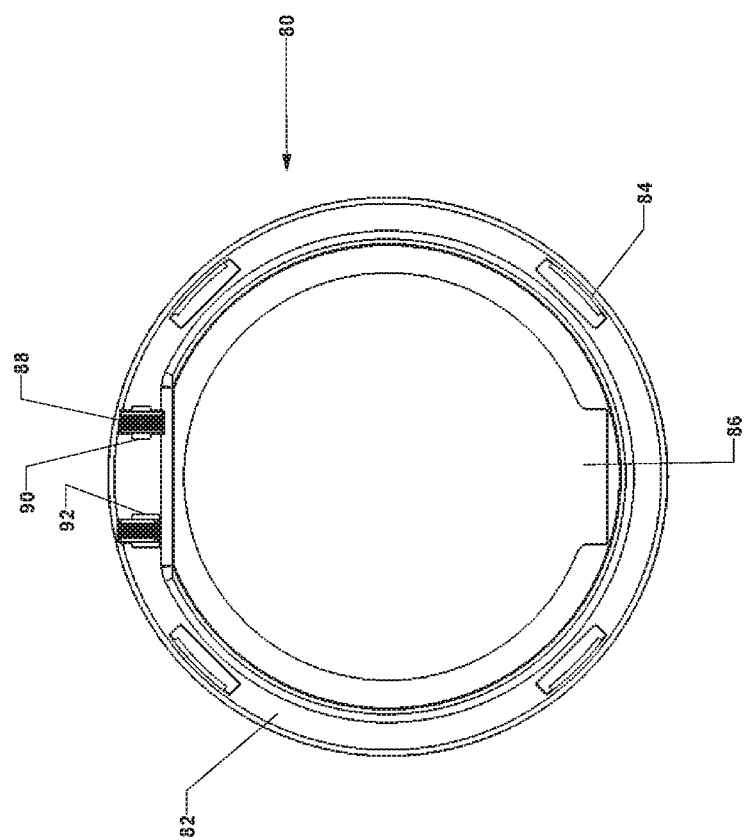
FIG. 3 shows a top view of a locking ring used in one aspect of the present invention.

FIG. 3 shows a top view of a locking ring 80 used in one aspect of the present invention. The locking ring 80 is shown with optional alignment slots 84 in engagement with alignments posts from the bucket container segment (1 of FIG. 1). The engagement elements 88 are shown with male posts 90 or female receptors 92 for posts on the closing cap (2 of FIG. 1). These are alternative engagement elements and need not be combined. A top ledge 82 is shown which is interrupted by a recessed area 86 enabling locking snap-in engagement with a snap in extension (56 in FIG. 2) from the closing cap.

Figure 4:
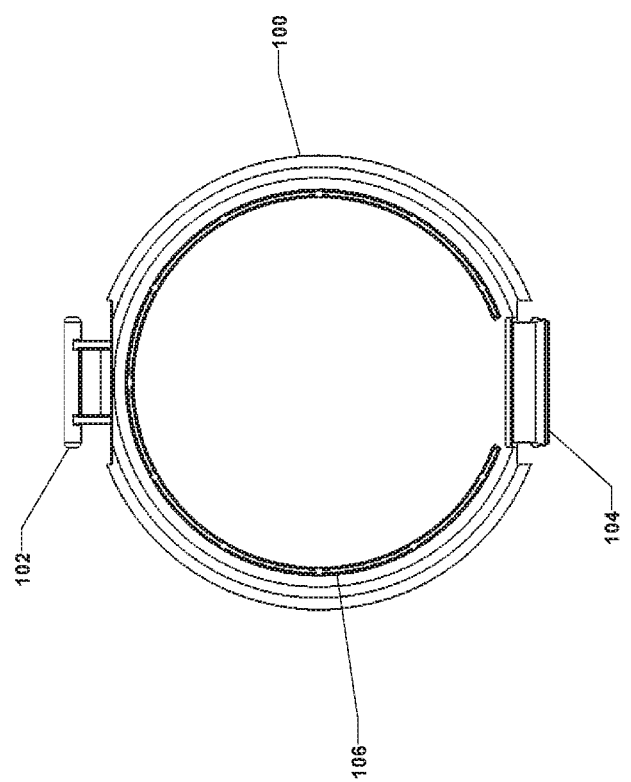
FIG. 4 shows a top view of a (preferably with a snap-closure) closure cap that engages the locking ring of FIG. 3 in one aspect of the present invention.

FIG. 4 shows a top view of a snapping closure cap 100 that engages the locking ring 80 of FIG. 3 in one aspect of the present invention. The closure cap 100 is shown with male post engagement element 102 that engages and forms the pivoting engagement elements 58 of FIG. 2. Also shown are an inner top portion 106 that supports a living hinge snap-in extension 104 that securely engages into the recessed area 86 of the locking cap 80 of FIG. 3.

What is claimed:

1. A bait bucket for temporary storage of fishing bait and water comprising:
   a water stable bucket component having a water-tight base and side walls and a top opening;
   a locking cap that is removeably secured around the top opening in the bucket component and further comprises a connector receiving a pivoting closing cap and a locking snap-in element that temporarily secures the pivoting closing cap to the locking cap, and a handle pivotably attached to the bucket component enabling lifting of the bait bucket wherein the locking cap has slots vertically through a top of the locking cap that aligns with visually observable elements on a top surface of the bucket component to assist in respective alignments of the handle, and the snap engaging elements.

2. The bait bucket of claim 1 wherein the locking cap is secured around the top opening of the bucket component by engaged screw threads on the bucket component and the locking cap and the pivoting is engaged through a post on the closing cap that engages receptors on the locking cap.

3. The bait bucket of claim 2 wherein the bucket component has aeration holes near a top of the bucket component and the handle pivots around posts extending outward from a top area of the bucket component.

4. The bait bucket of claim 3 wherein the bucket component has aeration holes near a top of the bucket component.

5. The bait bucket of claim 2 wherein the bucket component has aeration holes near a top of the bucket component.

6. The bait bucket of claim 1 wherein the locking cap is secured around the top opening of the bucket component by snap engaging elements on the bucket component and/or the locking cap.

7. The bait bucket of claim 6 wherein the bucket component has aeration holes near a top of the bucket component.

8. The bait bucket of claim 1 wherein the pivoting closing cap is engaged through a pivoting post on the closing cap that engages receptors on the locking cap.

9. The bait bucket of claim 8 wherein the pivoting closing cap further comprises a living hinge snap-in element that temporarily secures the pivoting closing cap to the locking cap.

10. The bait bucket of claim 9 wherein the bucket component has aeration holes near a top of the bucket component.

11. The bait bucket of claim 8 wherein the bucket component has aeration holes near a top of the bucket component.

12. The bait bucket of claim 1 wherein the bucket component has aeration holes near a top of the bucket component.

* * * * *